United States Patent
Guo et al.

(10) Patent No.: US 12,405,363 B2
(45) Date of Patent: Sep. 2, 2025

(54) DUAL SENSING METHOD OF OBJECT AND COMPUTING APPARATUS FOR OBJECT SENSING

(71) Applicant: Wistron Corporation, New Taipei (TW)

(72) Inventors: Jiun-In Guo, Hsinchu (TW); Jia-Jheng Lin, Hsinchu (TW)

(73) Assignee: Wistron Corporation, New Taipei (TW)

( * ) Notice: Subject to any disclaimer, the term of this patent is extended or adjusted under 35 U.S.C. 154(b) by 538 days.

(21) Appl. No.: 17/951,115

(22) Filed: Sep. 23, 2022

(65) Prior Publication Data

US 2023/0375694 A1    Nov. 23, 2023

(30) Foreign Application Priority Data

May 19, 2022   (TW) .................................. 111118729

(51) Int. Cl.
*G01S 13/86* (2006.01)
*G01S 7/295* (2006.01)
*G01S 13/72* (2006.01)

(52) U.S. Cl.
CPC .......... *G01S 13/867* (2013.01); *G01S 7/2955* (2013.01); *G01S 13/723* (2013.01)

(58) Field of Classification Search
CPC .... G01S 7/2955; G01S 13/865; G01S 13/867; G01S 13/723
See application file for complete search history.

(56) References Cited

U.S. PATENT DOCUMENTS

| | | | | |
|---|---|---|---|---|
| 12,061,088 | B2 * | 8/2024 | Wang | G08G 1/165 |
| 2019/0311546 | A1 * | 10/2019 | Tay | G06T 7/521 |
| 2019/0346559 | A1 * | 11/2019 | Eljarat | G01S 7/411 |
| 2020/0175315 | A1 * | 6/2020 | Gowaikar | G01S 13/867 |

(Continued)

FOREIGN PATENT DOCUMENTS

| | | |
|---|---|---|
| CN | 110865388 | 3/2020 |
| CN | 112847343 | 5/2021 |

(Continued)

OTHER PUBLICATIONS

"Search Report of Europe Counterpart Application", issued on Aug. 18, 2023, p. 1-p. 10.

(Continued)

*Primary Examiner* — Peter M Bythrow
(74) *Attorney, Agent, or Firm* — JCIPRNET

(57) ABSTRACT

A dual sensing method of an object and a computing apparatus for object sensing are provided. In the method, a first clustering is performed on radar information including a plurality of sensing points and is for determining a first part of the sensing points to be an object. A second clustering is performed on a result of the first clustering and is for determining that the sensing points determined to be the object in the result of the first clustering are located in a region of a first density. A result of the second clustering is taken as a region of interest. According to the region of interest, object detection and/or object tracking is performed on combined information formed by combining the radar information and an image, whose respective detection region and photographing region are overlapped.

18 Claims, 13 Drawing Sheets

(56) References Cited

U.S. PATENT DOCUMENTS

| | | | |
|---|---|---|---|
| 2021/0080558 A1* | 3/2021 | Gosala | G01S 13/931 |
| 2021/0103029 A1* | 4/2021 | Liu | G01S 13/931 |
| 2021/0117659 A1* | 4/2021 | Foroozan | G06V 10/25 |
| 2021/0255304 A1* | 8/2021 | Fontijne | G06V 20/10 |
| 2021/0389451 A1* | 12/2021 | Barngrover | G01S 13/9021 |
| 2022/0035022 A1* | 2/2022 | Alliot | G01S 13/867 |
| 2022/0319188 A1* | 10/2022 | Kogut | G06V 20/58 |
| 2022/0343637 A1* | 10/2022 | Zhou | G08G 1/0112 |
| 2023/0059883 A1* | 2/2023 | Hu | G01S 7/4802 |
| 2023/0109909 A1* | 4/2023 | Meng | G01S 13/931 |
| | | | 342/54 |
| 2023/0126749 A1* | 4/2023 | Ali | G01S 13/89 |
| | | | 342/61 |
| 2023/0139751 A1* | 5/2023 | Sanderovich | G01S 13/89 |
| | | | 382/103 |
| 2023/0192121 A1* | 6/2023 | Zhang | G06F 18/23213 |
| | | | 701/25 |
| 2023/0196728 A1* | 6/2023 | Flores Tapia | G06F 18/2321 |
| | | | 382/103 |
| 2023/0282000 A1* | 9/2023 | Pang | G01S 7/412 |
| | | | 382/103 |
| 2023/0311930 A1* | 10/2023 | Lasram | G01S 13/931 |
| | | | 701/2 |
| 2023/0351769 A1* | 11/2023 | Wu | G06V 10/762 |
| 2024/0183944 A1* | 6/2024 | Ueta | G01S 7/412 |

FOREIGN PATENT DOCUMENTS

| | | |
|---|---|---|
| TW | 202028778 | 8/2020 |
| TW | 202109078 | 3/2021 |

OTHER PUBLICATIONS

"Office Action of Taiwan Counterpart Application", issued on Nov. 21, 2022, p. 1-p. 8.

* cited by examiner

DUAL SENSING METHOD OF OBJECT AND COMPUTING APPARATUS FOR OBJECT SENSING

CROSS-REFERENCE TO RELATED APPLICATION

This application claims the priority benefit of Taiwanese application serial no. 111118729, filed on May 19, 2022. The entirety of the above-mentioned patent application is hereby incorporated by reference herein and made a part of this specification.

BACKGROUND

Technical Field

The invention relates to a sensing information processing technology, and particularly relates to a dual sensing method of an object and a computing apparatus for object sensing.

Description of Related Art

In an intelligent transportation system, various sensors distributed at various places each play an important role. These sensors collect accurate and real-time local information and transmit the information to a cloud, such that the system may grasp a situation of a place in real time and make decisions accordingly. In many sensors, a camera and a radar each play an important role. The camera has rich image information, which may serve for a deep learning model to identify an object type. However, in harsh environments, image identification is likely to fail. On the other hand, millimeter waves used in a radar are relatively unaffected by bad weather and may detect physical information such as a position and a velocity of an object. However, the radar cannot identify an object type. According to the above description, there are respective issues in camera sensing and radar sensing.

SUMMARY

The embodiments of the invention are directed to a dual sensing method of an object and a computing apparatus for object sensing, in which camera sensing and radar sensing are integrated.

An embodiment of the invention provides a dual sensing method of an object, which includes (but is not limited to) the following. A first clustering is performed on radar information. A second clustering is performed on a result of the first clustering. A result of the second clustering is taken as one or more regions of interest. Object detection and/or object tracking is performed on combined information according to the regions of interest. The radar information includes a plurality of sensing points, and the first clustering is for determining a first part of the sensing points to be one or more objects. The second clustering is for determining that the sensing points determined to be the object in the result of the first clustering are located in a region of a first density. The combined information is formed by combining the radar information and an image, and a detection region of the radar information is overlapped with a photographing region of the image.

An embodiment of the invention provides a computing apparatus for object sensing, which includes (but is not limited to) a memory and a processor. The memory is configured to store a program code. The processor is coupled to the memory. The processor is configured to load and execute the program code to: perform a first clustering on radar information, perform a second clustering on a result of the first clustering, take a result of the second clustering as one or more regions of interest, and perform object detection and/or object tracking on combined information according to the regions of interest. The radar information includes a plurality of sensing points, and the first clustering is for determining a first part of the sensing points to be one or more objects. The second clustering is for determining that the sensing points determined to be the objects in the result of the first clustering are located in a region of a first density. The combined information is formed by combining the radar information and an image, and a detection region of the radar information is overlapped with a photographing region of the image.

Based on the above descriptions, according to the dual sensing method of an object and the computing apparatus for object sensing of the embodiments of the invention, the radar information is performed with two times of clustering and taken as the combined information of double sensing in the region of interest used for object detection and/or object tracking.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
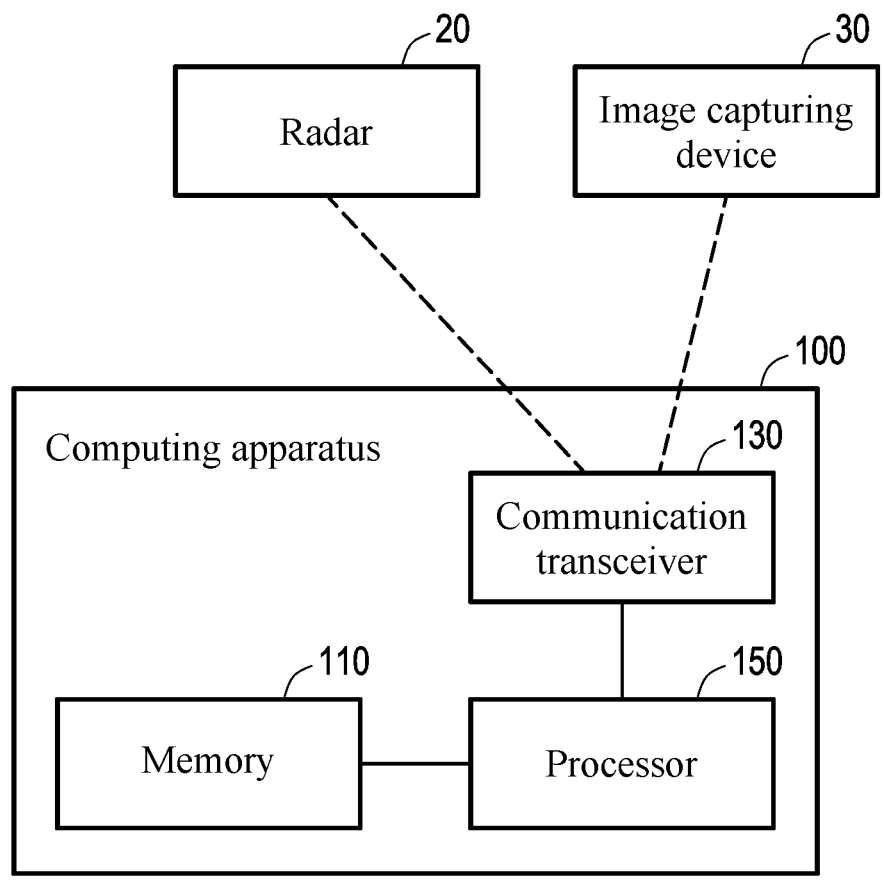
FIG. 1 is a component block diagram of a sensing system according to an embodiment of the invention.

FIG. 1 is a component block diagram of a sensing system 1 according to an embodiment of the invention. Referring to FIG. 1, the sensing system 1 includes (but is not limited to) a radar 20, an image capturing device 30 and a computing apparatus 100. It should be noted that, in FIG. 1, one radar 20 and one image capturing device 30 are taken as an example for description, but the numbers thereof are not limited thereto.

The radar 20 is a device that transmits radio waves, light, or sound waves into a space and detects echoes reflected by objects in the space. In one embodiment, radar information such as a relative position, a relative velocity, a direction, and/or an intensity may be determined according to the echoes.

The image capturing device 30 may be a camera, a video camera, a monitor, a smart phone, or a road side unit (RSU) with an image capturing function, and accordingly captures images within a specified field of view.

The computing apparatus 100 may be a smart phone, a tablet computer, a server, a cloud host, or a computer host. The computing apparatus 100 includes (but is not limited to) a memory 110, a communication transceiver 130, and a processor 150.

The memory 110 may be any type of fixed or movable random access memory (RAM), read only memory (ROM), flash memory (flash memory), conventional hard disk drive (HDD), solid-state drive (SSD) or similar components. In an embodiment, the memory 110 is configured to store program codes, software modules, configurations, data (for example, images, radar information, sensing results, etc.) or files, and embodiments thereof will be described in detail later.

The communication transceiver 130 may be a communication transceiver, a serial communication interface (such as RS-232) supporting fourth generation (4G) or other generation mobile communication, Wi-Fi, Bluetooth, infrared, radio frequency identification (RFID), Ethernet, optical fiber network, etc, or may be universal serial bus (USB), thunderbolt or other communication transmission interfaces. In an embodiment of the invention, the communication transceiver 130 is configured to transmit data to or receive data from other electronic devices (for example, the radar 20, the image capturing device 30).

The processor 150 is coupled to the memory 110 and the communication transceiver 130. The processor 150 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator or other similar elements or a combination of the above elements. In one embodiment, the processor 150 is configured to execute all of or a part of tasks of the computing apparatus 100, and may load and execute each program code, software module, file, and data stored in the memory 110. In some embodiments, the functions of the processor 150 may be implemented by software or chips.

In some embodiments, either of the radar 20 and the image capturing device 30 may be integrated with the computing apparatus 100 to form an independent device.

Hereinafter, the method described in the embodiment of the invention will be described with reference to various devices, components, and modules in the sensing system 1. Each process of the method may be adjusted according to an actual implementation situation, which is not limited by the invention.

Figure 2:
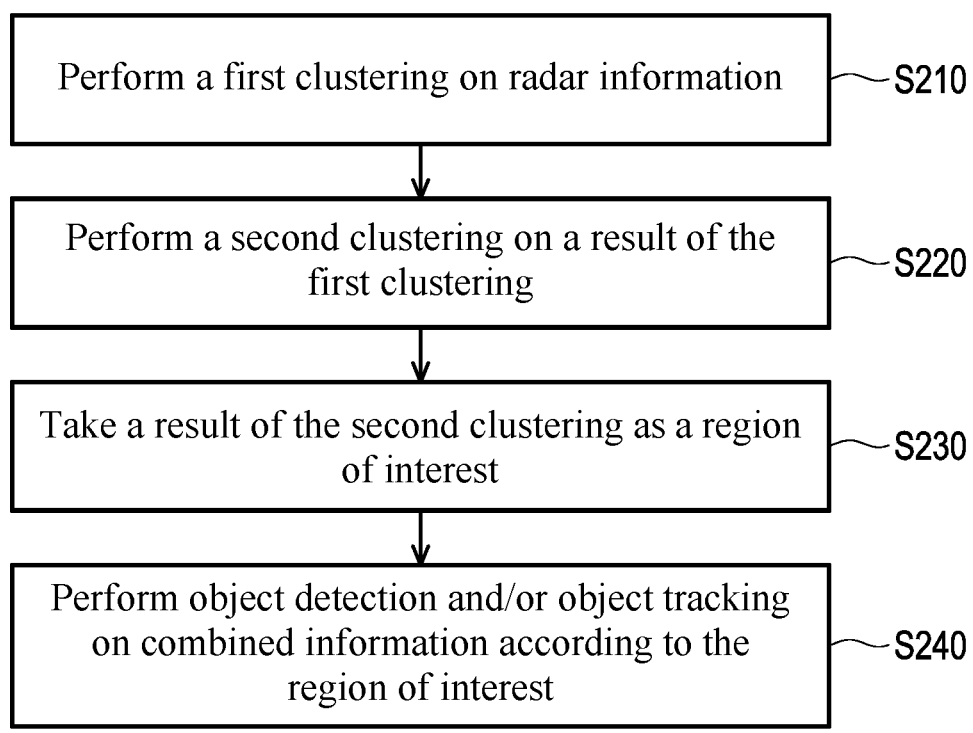
FIG. 2 is a flowchart of a dual sensing method of an object according to an embodiment of the invention.

FIG. 2 is a flowchart of a dual sensing method of an object according to an embodiment of the invention. Referring to FIG. 2, the processor 150 performs a first clustering on radar information (step S210). Specifically, the radar information includes one or a plurality of sensing points in a space. These sensing points are derived from echoes of the radar 20. Namely, the echoes generated by reflection of objects in a space to electromagnetic waves, light waves or sound waves emitted by the radar may be used to obtain the sensing points of the objects in a space. For example, a continuous wave (CW) with variable frequency emitted by a frequency modulated continuous wave (FMCW) radar during a frequency sweep period. There are certain frequency differences between echoes reflected by the objects and transmission signals emitted by the radar 20. Such frequency differences may be used to determine relative positions or distances between the objects and the radar 20. These objects whose relative positions or distances may be obtained may form one or more sensing points in a sensing result of the radar.

Figure 3A:
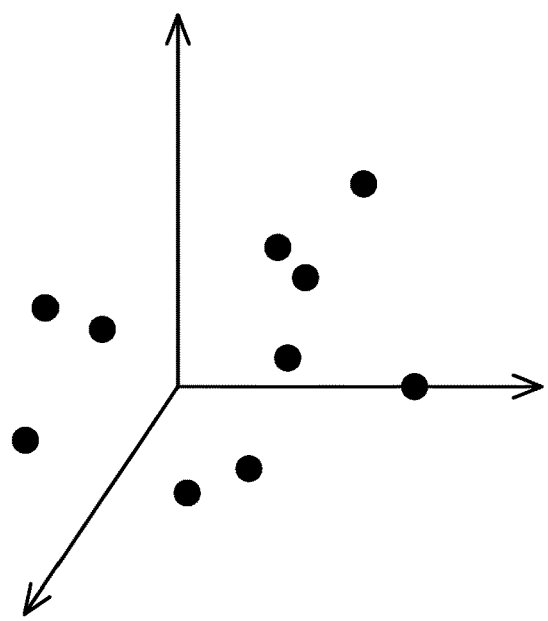
FIG. 3A is a schematic diagram of sensing points of radar information in a space according to an embodiment of the invention.

For example, FIG. 3A is a schematic diagram of sensing points of radar information in a space according to an embodiment of the invention. Referring to FIG. 3A, it is assumed that the radar information is in the form of a point cloud map, the sensing points (circles shown in the figure) in the point cloud map represent possible objects at corresponding positions in a space.

The first clustering is used to determine that a first part of the sensing points to be one or a plurality of objects. The first part may be all of or a part of the sensing points in the radar information. Namely, to determine whether a part of or all of the sensing points have an object. The clustering method (which also known as a grouping method) used in the first clustering may be a K-means algorithm, a Gaussian mixture model (GMM), a mean-shift algorithm, a hierarchical clustering method, a spectral clustering algorithm, a density-based spatial clustering of applications with noise (DBSCAN) algorithm or other clustering/grouping algorithms.

Taking DBSCAN as an example, a distance parameter and a point number (or referred to as the least number of points in the group) parameter may be set. Then, each sensing point is taken as a center point and the distance parameter is taken as a radius to form a circle. If the number of the sensing points in the circle is greater than the point number parameter, the sensing point serving as the center point of the circle is taken as a core point, and the other sensing points in the circle are marked and connected. If the number of the sensing points in the circle is not greater than the point number parameter, the sensing point serving as the center point of the circle is not the core point, and the other sensing points in the circle will not be connected. Then, the connected sensing points are assigned to a same group. While other outlier points (i.e., the unconnected sensing points) may be assigned to different groups.

It should be noted that, in some applications, compared with the K-means algorithm, DBSCAN is more suitable for applications in the field of automation. However, the embodiment of the invention does not limit the type of the clustering method. Ultimately, those sensing points that form a group may be regarded as an object, while the sensing points that are not assigned to any group are not regarded as an object.

Figure 3B:
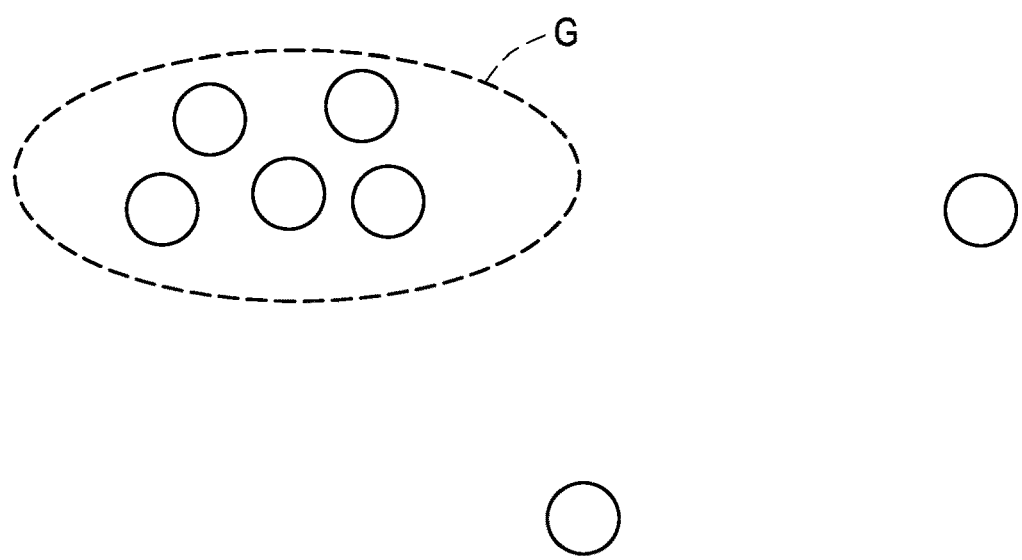
FIG. 3B is a schematic diagram of a first clustering according to an embodiment of the invention.

For example, FIG. 3B is a schematic diagram of the first clustering according to an embodiment of the invention. Referring to FIG. 3B, it is assumed that the first clustering is performed on the point cloud map of FIG. 3A, the sensing points located in an upper left region of FIG. 3B may be assigned to a group G.

Referring to FIG. 2, the processor 150 performs a second clustering on a result of the first clustering (step S220). Specifically, the second clustering is used to determine that the sensing points determined to be objects in the result of the first clustering are located in a region of a first density. In other words, regarding the sensing points that have been assigned to the group according to the result of the first clustering (for example, excluding the sensing points that are not assigned to the group by the first clustering), clustering is again performed (i.e. the second clustering) to determine which areas have denser sensing points or more objects. The region with the first density is a region formed by those sensing points assigned to the group resulting from the second clustering. Parameters used by the second clustering define the first density. In addition, the clustering method (which is also referred to as grouping method) used by the second clustering may be K-means algorithm, GMM, mean-shift, hierarchical clustering, spectral clustering algorithm, DBSCAN algorithm or other clustering/grouping algorithms.

In an embodiment, if the DBSCAN algorithm is used, a point number (for example, the aforementioned point number parameter) of the second clustering is less than a point number of the first cluster, and a range of the second clustering (for example, the aforementioned distance parameter) is smaller than a range of the first clustering. In an embodiment, the point number (for example, the aforementioned point number parameter) of the second clustering may also be greater than the point number of the first clustering, and the range of the second clustering (for example, the aforementioned distance parameter) is greater than the range of the first clustering.

Figure 3C:
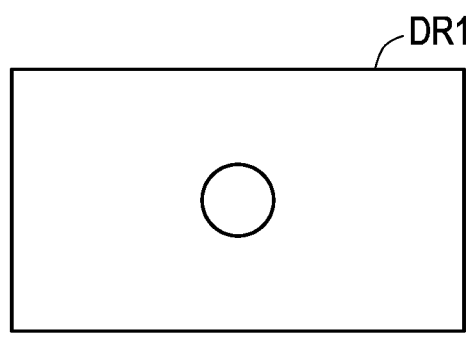
FIG. 3C is a schematic diagram of a second clustering according to an embodiment of the invention.

For example, FIG. 3C is a schematic diagram of a second clustering according to an embodiment of the invention. Referring to FIG. 3B and FIG. 3C, it is assumed that the point number parameter of the first clustering in FIG. 3B is 4 and the distance parameter is 40 pixels. If the pixel number of 40 is used as a radius of a circle, there are more than 4 center sensing points of the sensing points serving as core points. Finally, the first clustering forms 3 core points. The point number parameter of the second clustering of FIG. 3C is 2 and the distance parameter is 30 pixels. If the pixel number of 30 is taken as the radius of the circle, there are more than 2 center sensing points of the sensing points serving as core points. Finally, the second clustering forms 1 core point, and the circle of the one core point may be regarded as the region of the first density.

It should be noted that there may be other changes in the parameters used for clustering. In addition, the results of the first clustering and the second clustering may be converted into image coordinates, i.e., the sensing points in the group may be converted from radar coordinates to image coordinates. The coordinate conversion will be described in detail in subsequent embodiments.

Referring to FIG. 2, the processor 150 takes a result of the second clustering as one or a plurality of regions of interest (step S230). Specifically, if the result of the second clustering is that there are sensing points in a region of a first density or a region forming the group, the processor 150 uses the sensing points in the region to form a (dynamic) region of interest. A shape and size of the region of interest may be predefined or determined according to a settings input by a user. In an embodiment, the processor 150 may take a center of sensing points in the region having the first density as a center of the region of interest. For example, a core of the second clustering is the center of the region of interest. Taking FIG. 3C as an example, a core point is roughly located at a center of a region of interest DR1.

On the other hand, if the result of the second clustering is a region that does not have the first density or does not form a group, the processor 150 takes one or a plurality of fixed regions as (fixed) regions of interest. These fixed regions are predefined. For example, a region derived from previous detection or tracking results, or any designated region.

Figure 4A:
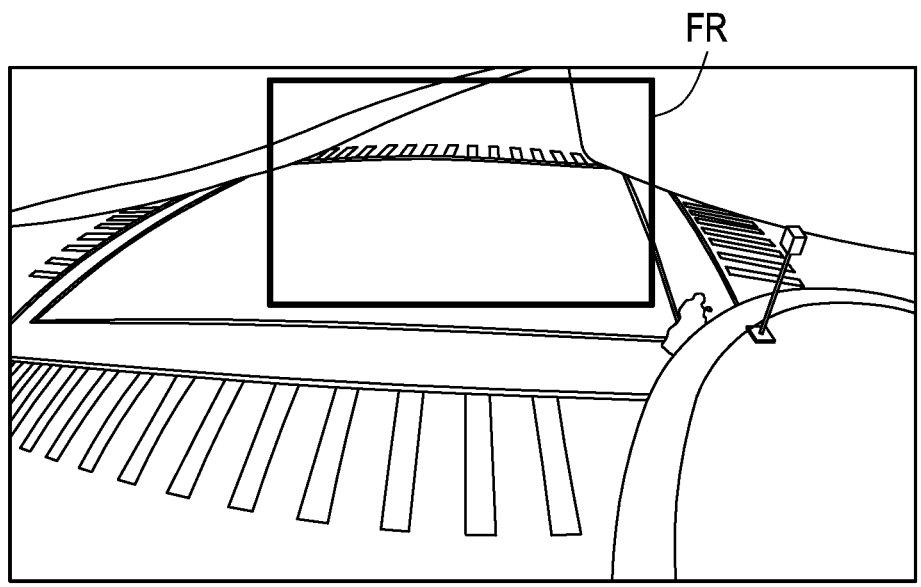
FIG. 4A is a schematic diagram of a fixed region according to an embodiment of the invention.
Figure 4B:
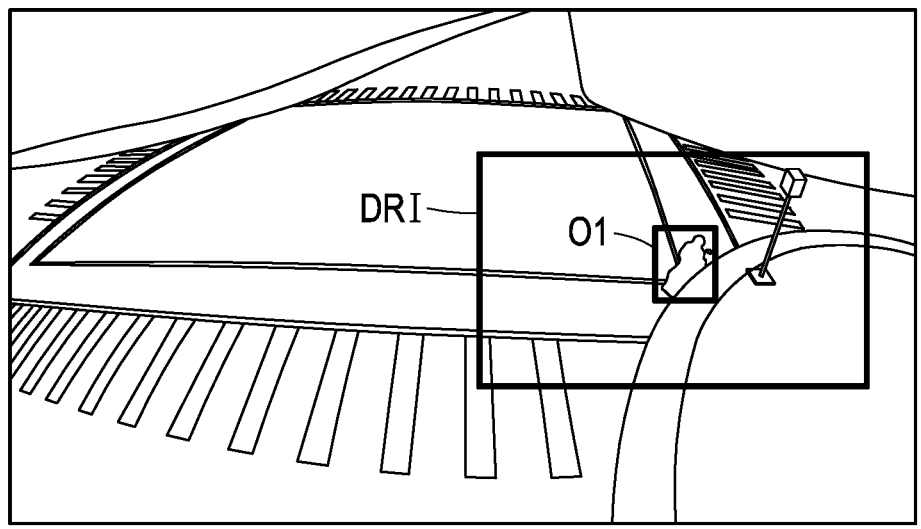
FIG. 4B is a schematic diagram of a dynamic region of interest according to an embodiment of the invention.

For example, FIG. 4A is a schematic diagram of a fixed region FR according to an embodiment of the invention, and FIG. 4B is a schematic diagram of a (dynamic) region of interest DRI according to an embodiment of the invention. Referring to FIG. 4A and FIG. 4B, there is no object in the fixed region FR. However, there is an object O1 in the region of interest DRI obtained by the second clustering. Namely, the region with the first density obtained by the second clustering may reflect the existence of the object O1, which is helpful for subsequent object detection or tracking.

Referring to FIG. 2, the processor 150 performs object detection and/or object tracking on combined information according to the one or a plurality of regions of interest (step S240). Specifically, as described above, the region of interest derived from the two times of clustering is helpful for object detection and/or object tracking. On the other hand, the combined information is formed by combining the radar information with an image, and a detection region of the radar information is overlapped with a photographing region of the image. The image may be captured by the image capturing device 30. Namely, the detection region of the radar 20 is partially or completely overlapped with the photographing region (or referred to as a field of view) of the image capturing device 30.

Figure 5:
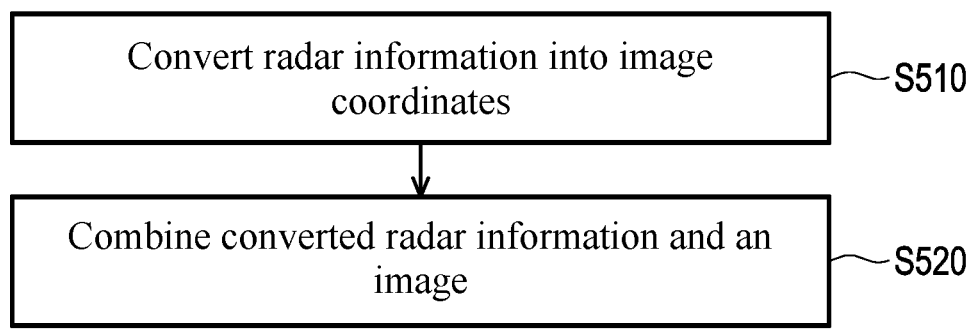
FIG. 5 is a flowchart of dual sensing combination according to an embodiment of the invention.
Figure 6:
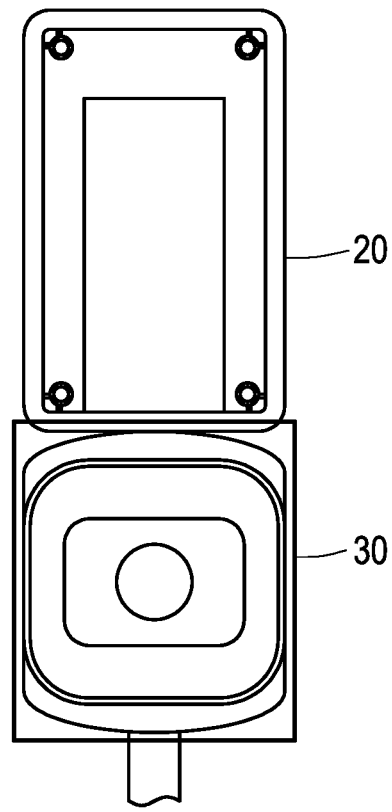
FIG. 6 is a schematic diagram of a positional relationship of dual sensing according to an embodiment of the invention.

In order to combine characteristics of radar sensing and image sensing, two types of information need to be integrated/combined first. FIG. 5 is a flowchart of dual sensing combination according to an embodiment of the invention. Referring to FIG. 5, in one embodiment, the processor 150 may convert coordinates of the sensing points in the radar information in the space into a plurality of image coordinates to generate converted radar information (step S510). The converted radar information includes radar information on the image coordinates. Namely, the radar information is mapped to a same coordinate system as that of the image. The radar 20 may be configured to obtain the radar information, and the image capturing device 30 may be configured to obtain the image. It should be noted that installation positions and sensing directions of the radar 20 and the image capturing device 30 are different. For example, FIG. 6 is a schematic diagram of a positional relationship of dual sensing according to an embodiment of the invention. Referring to FIG. 6, the radar 20 is disposed above the image capturing device 30. Therefore, information correction may be first performed before the two types of information are combined.

Figure 7:
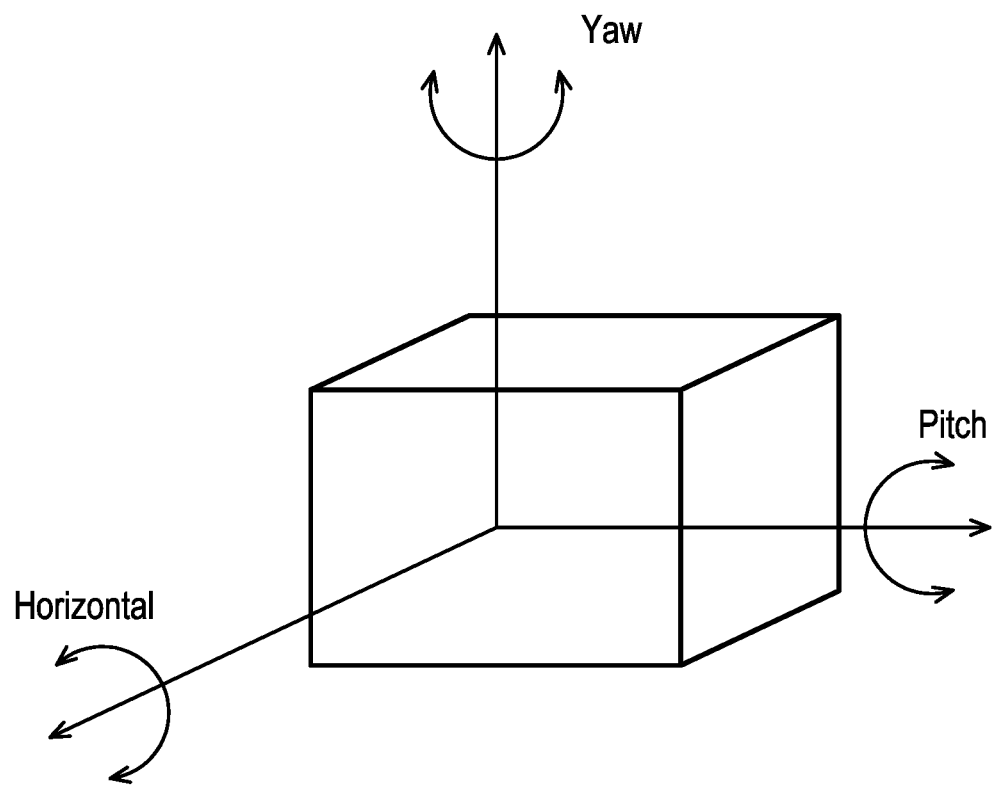
FIG. 7 is a spatial schematic diagram of an arrangement of a radar according to an embodiment of the invention.

First, the processor 150 may obtain a setting posture of the radar 20. Such posture may be defined by rotation angles on three vertical axes (for example, pitch, yaw, and horizontal (or roll) angles). FIG. 7 is a spatial schematic diagram of an arrangement of the radar 20 according to an embodiment of the invention. Refer to FIG. 7, for the convenience of description, a horizontal angle of zero degree is taken as an example for description, but the invention is not limited thereto.

Figure 8:
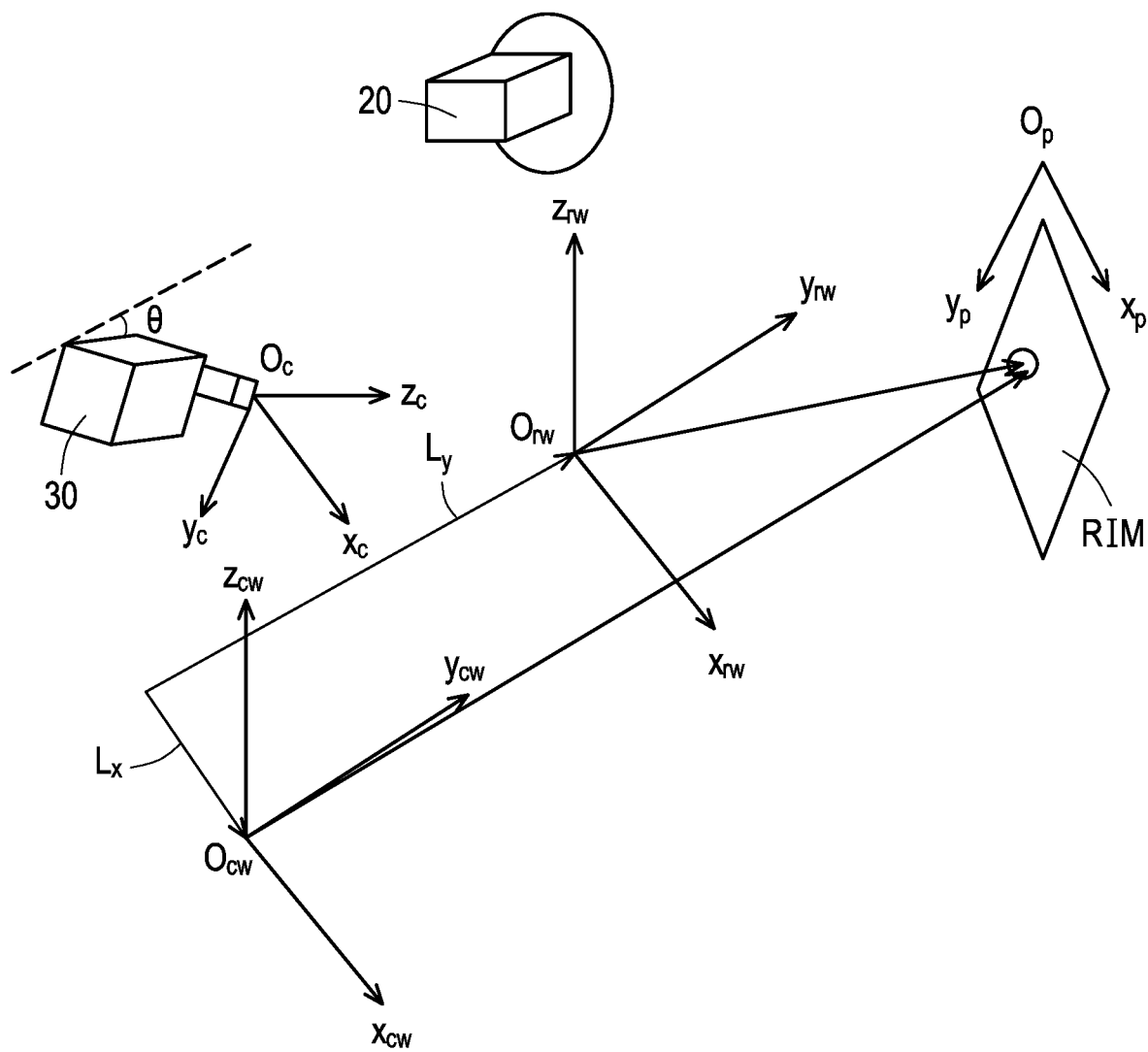
FIG. 8 is a schematic diagram of a radar, a camera, and image coordinates according to an embodiment of the invention.

FIG. 8 is a schematic diagram of a radar, a camera, and image coordinates according to an embodiment of the invention. Referring to FIG. 8, the processor 150 may convert radar world coordinates $O_{rw}$-$x_{rw}y_{rw}z_{rw}$ ($O_{rw}$ is an origin, and $x_{rw}$, $y_{rw}$, and $z_{rw}$ are respectively coordinates of three axes) into camera world coordinates $O_{cw}$-$x_{cw}y_{cw}z_{cw}$ ($O_{cw}$ is an origin, $x_{cw}$, $y_{cw}$ and $z_{cw}$ are respectively coordinates of the three axes). The radar world coordinates represent the coordinates of the radar 20, and the camera world coordinates represent the coordinates of the image capturing device 30. The processor 150 may convert the camera world coordinates $O_{cw}$-$x_{cw}y_{cw}z_{cw}$ to camera coordinates $O_c$-$x_cy_cz_c$ ($O_c$ is an origin, and $x_c$, $y_c$, and $z_c$ are respectively coordinates of the three axes). The camera coordinates $O_c$-$x_cy_cz_c$ are coordinates in the coordinate system formed by the image capturing device 30 in a photographing field of view when a horizontal axis (for example, the axis corresponding to the coordinate yew) forms a pitch angle θ. Then, the processor 150 may convert the camera coordinates $O_c$-$x_cy_cz_c$ to image coordinates $O_p$-$x_py_p$ (i.e., the coordinates in the image captured by the image capturing device 30, $O_p$ is an origin, and $x_p$, $y_p$ are respectively coordinates of two axes).

To be specific, regarding the conversion from the radar world coordinate $O_{rw}$-$x_{rw}y_{rw}z_{rw}$ to the camera world coordinate $O_{cw}$-$x_{cw}y_{cw}z_{cw}$, since the initial radar information obtained by the radar 20 is only two-dimensional information, only the two-dimensional relative distance between the radar 20 and the object may be obtained. In order to obtain the radar world coordinates, the processor 150 may determine a yaw angle of the radar 20 and a height difference between the radar 20 and the object.

Figure 9:
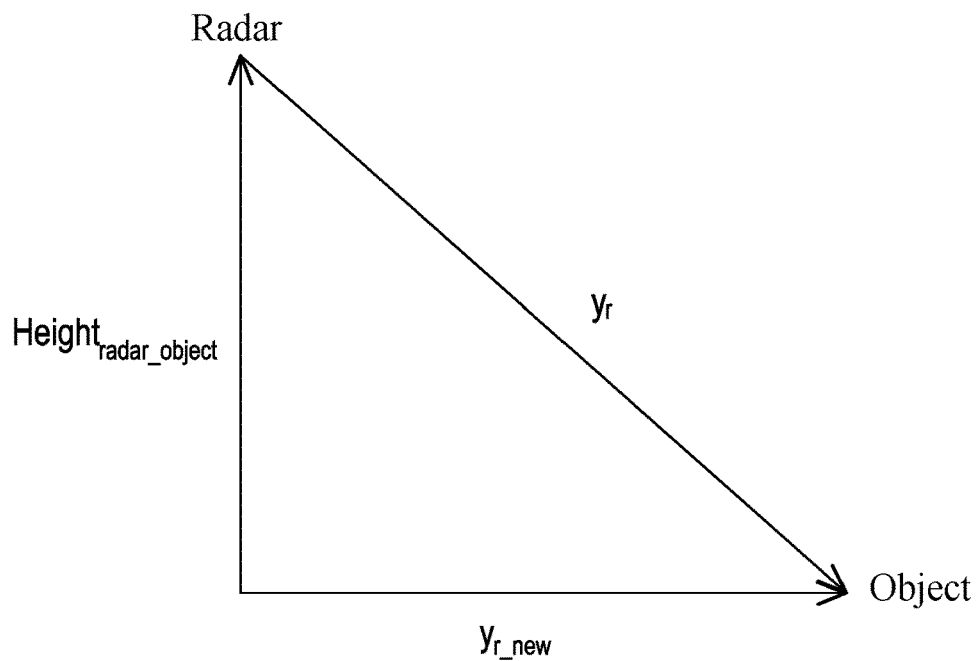
FIG. 9 is a schematic diagram of a positional relationship between a radar and an object according to an embodiment of the invention.

FIG. 9 is a schematic diagram of a positional relationship between the radar 20 and the object according to an embodiment of the invention. Referring to FIG. 9, since the radar 20 lacks information of an axis (for example, a vertical axis), a projection depth distance $y_{r\_new}$ needs to be determined according to a height difference. $y_r$ is a depth distance between the radar 20 and the object. $Height_{radar\_object}$ is a height difference between the radar 20 and the object. Therefore, the projection depth distance $y_{r\_new}$ may be derived from equation (1):

$$y_{r\_new} = \sqrt{y_r^2 - Height_{radar\_object}^2} \quad (1)$$

Figure 10:
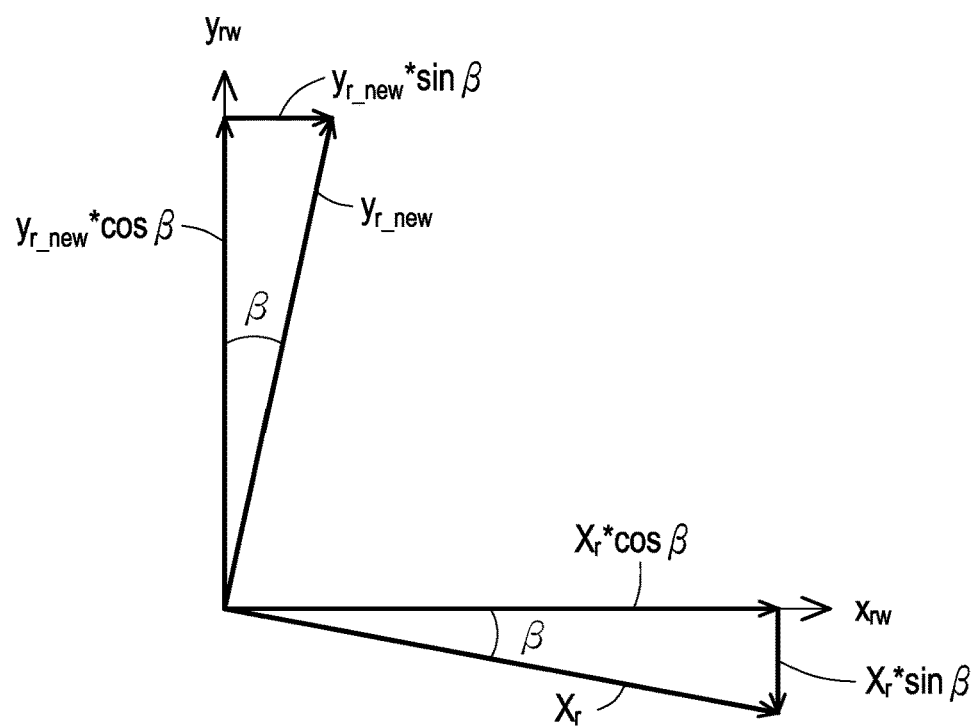
FIG. 10 is a schematic diagram illustrating a relationship among radar coordinates, radar world coordinates and a yaw angle according to an embodiment of the invention.

FIG. 10 is a schematic diagram illustrating a relationship among radar coordinates, radar world coordinates and a yaw angle according to an embodiment of the invention. Referring to FIG. 10, β is the yaw angle of the radar 20. A coordinate relationship between the radar coordinates and the radar world coordinates may be obtained from equations (2) and (3):

$$x_{rw} = x_r * \cos \beta + y_{r\_new} * \sin \beta \quad (2)$$

$$y_{rw} = (-x_r * \sin \beta) + y_{r\_new} * \cos \beta \quad (3)$$

In an embodiment, the processor 150 may set a coordinate relationship between the radar world coordinates and the camera world coordinates according to a relative position of the radar 20 and the image capturing device 30. Such coordinate relationship may be derived from equations (4), (5):

$$x_{cw} = x_{rw} - L_x \quad (4)$$

$$y_{cw} = y_{rw} - L_y \quad (5)$$

$L_x$ and $L_y$ are the horizontal and vertical distances (i.e., the relative position) between the radar 20 and the image capturing device 30.

Then, the processor 150 may determine the image coordinates corresponding to each sensing point of the radar information according to the coordinate relationship. Any sensing point in the radar information is sequentially converted from the radar coordinates, the radar world coordinates, the camera world coordinates and the camera coordinates into image coordinates. To be specific, the conversion from radar coordinates and radar world coordinates to camera world coordinates is as described above, and detail thereof is not repeated. Then, the conversion from camera world coordinates to camera coordinates may be obtained from equation (6):

$$\begin{bmatrix} x_c \\ y_c \\ z_c \end{bmatrix} = \begin{bmatrix} 1 & 0 & 0 \\ 0 & -\sin\theta & -\cos\theta \\ 0 & \cos\theta & \sin\theta \end{bmatrix} \begin{bmatrix} x_{cw} \\ y_{cw} \\ z_{cw} \end{bmatrix} + \begin{bmatrix} 0 \\ H\cos\theta \\ H\sin\theta \end{bmatrix} \quad (6)$$

θ is a pitch angle, and H is a height of the image sensing device 30 relative to the ground.

Figure 11:
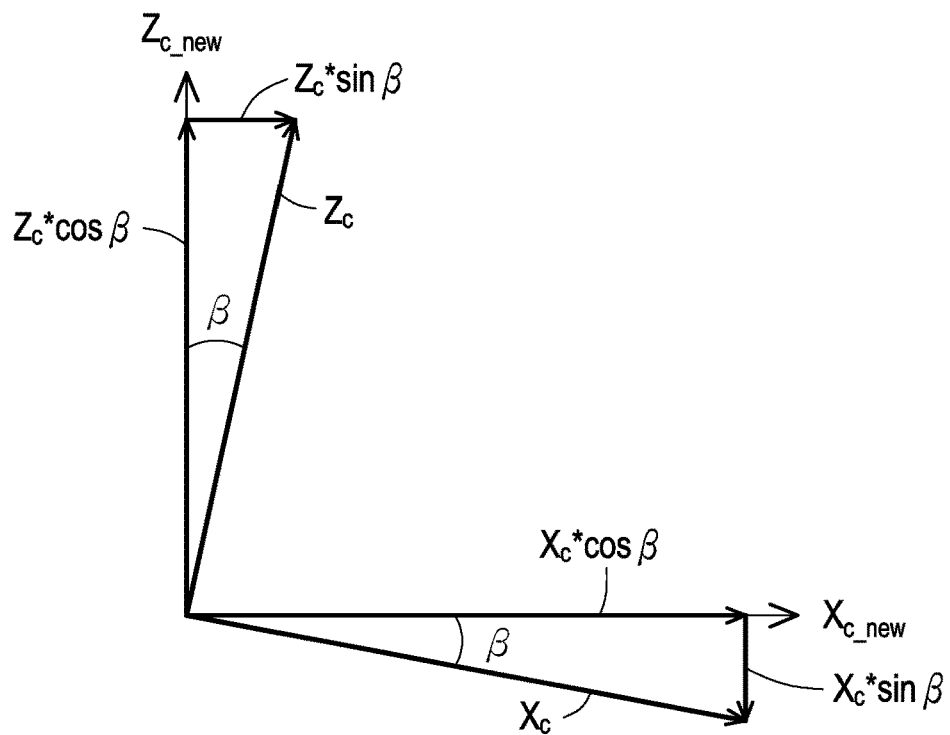
FIG. 11 is a schematic diagram illustrating a relationship between camera coordinates, new camera coordinates and a yaw angle according to an embodiment of the invention.

Then, considering a yaw angle β, FIG. 11 is a schematic diagram illustrating a relationship between camera coordinates, new camera coordinates and a yaw angle according to an embodiment of the invention. Referring to FIG. 11, the conversion from the (original) camera coordinates to the new camera coordinates may be obtained from following equations (7), (8) and (9):

$$x_{c\_new} = x_c * \cos \beta + z_c * \sin \beta \quad (7)$$

$$y_{c\_new} = y_c \quad (8)$$

$$z_{c\_new} = (-x_c * \sin \beta) + y_c * \cos \beta \quad (9)$$

It should be noted that if there is no yaw angle β, the camera coordinate conversion may be ignored.

Then, the conversion from camera coordinates to image coordinates, may be obtained from following equations (10) and (11):

$$x_p = \frac{x_{c\_new}}{z_{c\_new}} * f_x + c_x \quad (10)$$

$$y_p = \frac{y_{c\_new}}{z_{c\_new}} * f_y + c_y \quad (11)$$

Figure 12:
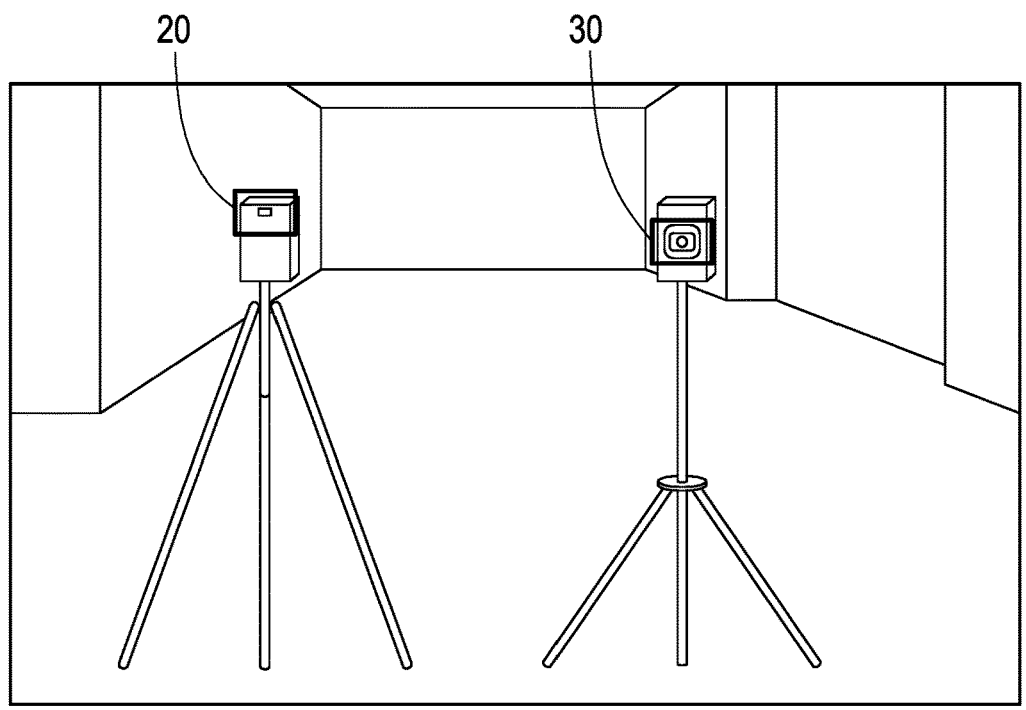
FIG. 12 is a schematic diagram of a positional relationship of dual sensing according to another embodiment of the invention.

It should be noted that the invention is not limited to the positional relationship between the radar 20 and the image capturing device 30 as shown in FIG. 6, and the positional relationship may also have other changes. For example, FIG. 12 is a schematic diagram of a positional relationship of dual sensing according to another embodiment of the invention. Referring to FIG. 12, the radar 20 is located on a left side of the image capturing device 30. Similarly, the coordinate conversion may be updated by changing the horizontal distance $L_x$ and the vertical distance $L_y$ in the equations (4), (5).

Figure 13:
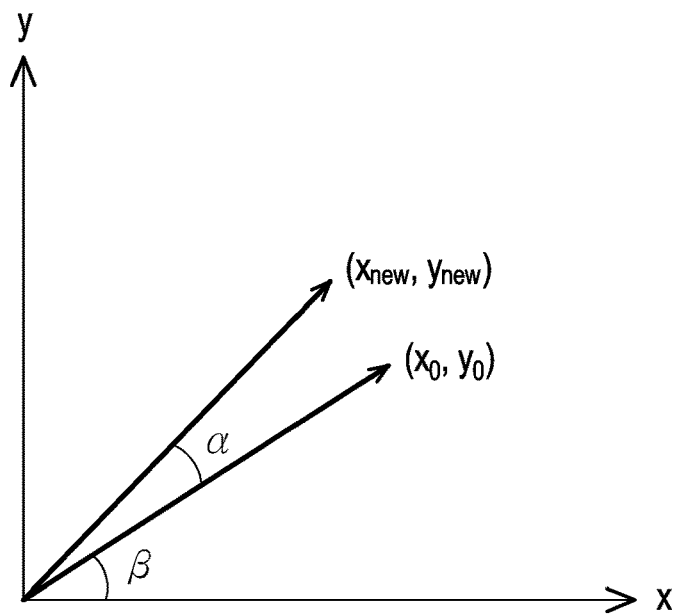
FIG. 13 is a schematic diagram of coordinate axis conversion according to an embodiment of the invention.

In an embodiment, neither the radar 20 nor the image capturing device 30 senses forward. For example, the horizontal angle is not zero. Therefore, coordinate axis conversion may be performed. For example, FIG. 13 is a schematic diagram of coordinate axis conversion according to an embodiment of the invention. Referring to FIG. 13, the relationship between a new coordinate axis and an original coordinate axis may be obtained from following equation (12):

$$\begin{bmatrix} x_{new} \\ y_{new} \end{bmatrix} = \begin{bmatrix} \cos(\alpha) & -\sin(\alpha) \\ \sin(\alpha) & \cos(\alpha) \end{bmatrix} \begin{bmatrix} x_0 \\ y_0 \end{bmatrix} \quad (12)$$

α is an included angle between the new coordinate axis and the original coordinate axis.

Figure 14:
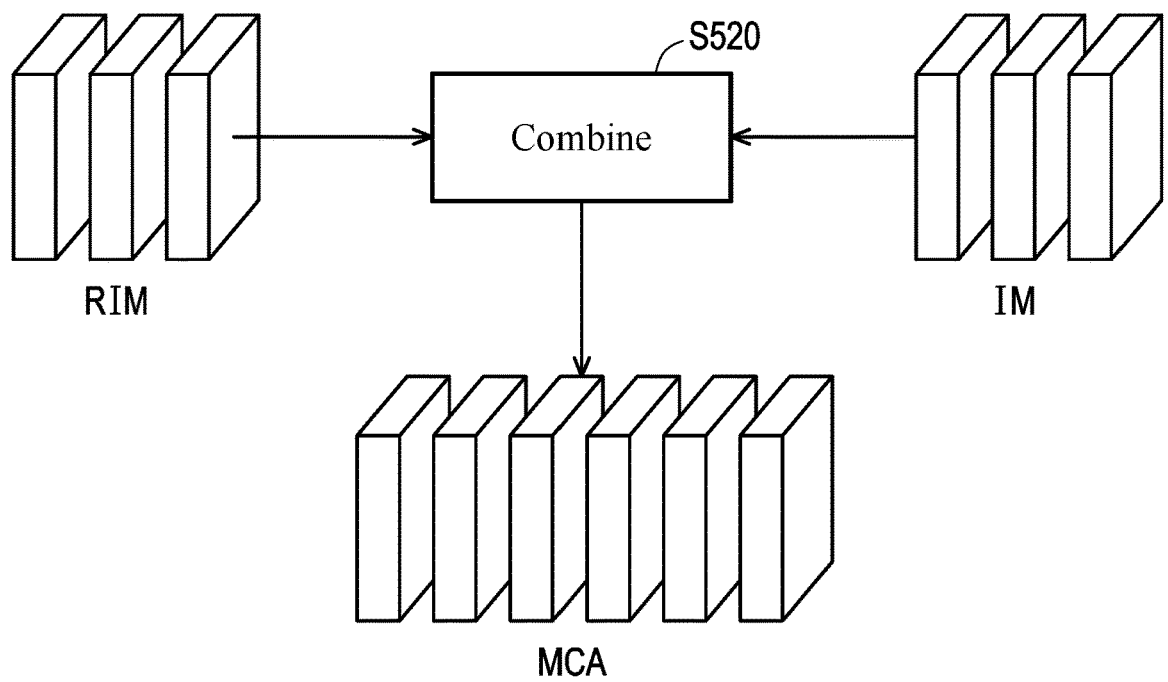
FIG. 14 is a schematic diagram of information combination according to an embodiment of the invention.

After the radar information is converted to the image coordinates, the processor 150 may combine the converted radar information (including the radar information on the image coordinates) and the image to generate combined information. FIG. 14 is a schematic diagram of information combination according to an embodiment of the invention. Referring to FIG. 14, in an embodiment, a first sensing type in the radar information includes a relative distance, a relative velocity and/or an intensity. A second sensing type in the image includes a plurality of color types defined by a color space. For example, a RGB (red-green-blue) color space has three color types of red, green, and blue. HSV (hue-saturation-value) has three color types of hue, saturation and value. The processor 150 may combine the converted radar information and the image into a sensing image of a plurality of channels according to the first sensing type and the second sensing type (step S520). The channels respectively correspond to the color types and at least one of the relative distance, the relative velocity, the intensity.

It should be noted that a feature map used by a deep learning model may distinguish the channels according to the color types. Taking RGB as an example, an image IM includes three channels. In order to jointly input the radar information and the image to the deep learning model, the converted radar information may be differentiated into multiple channels according to the sensing types. For example, the converted radar information is a radar image RIM after the radar information is mapped to the image coordinates. The radar image RIM includes three channels of a relative distance, a relative velocity and an intensity. In step S520, the processor 150 concatenates the image IM and the radar image RIM to form a multi-channel array MCA.

It should be noted that, in other embodiments, the radar image RIM may only take any two or any one of the three channels to be combined with the image IM. In addition, it is assumed that a pixel value of the radar image RIM is limited to 0-255, an upper limit value of each sensing type may be set. For example, the maximum relative distance is 90 meters, the maximum relative velocity is 33.3 meters per second, and the maximum intensity is 100 dBw. The conversion of the relative distance, the relative velocity and the intensity in the radar image RIM is as follows:

$$D = d*2.83 \quad (13)$$

$$V = |v|*7.65 \quad (14)$$

$$I = (10 \log_{10}(10^{SNR*0.01}*(P_{Noise}*0.1)))*2.55 \quad (15)$$

d is an original relative distance, D is a new relative distance, v is an original relative velocity, V is a new relative velocity, i is an original intensity, and I is a new intensity. Moreover, SNR is a signal-to-noise ratio, and $P_{Noise}$ is a noise power. If the new value (for example, the new relative distance, the new relative speed, or the new intensity) still exceeds 255, the new value is directly set to 255. After the new value is determined, the radar image RIM and the image IM may be combined into the multi-channel array MCA. In addition, according to an actual requirement, a size of each channel in the multi-channel array MCA may be adjusted to be consistent.

Figure 15:
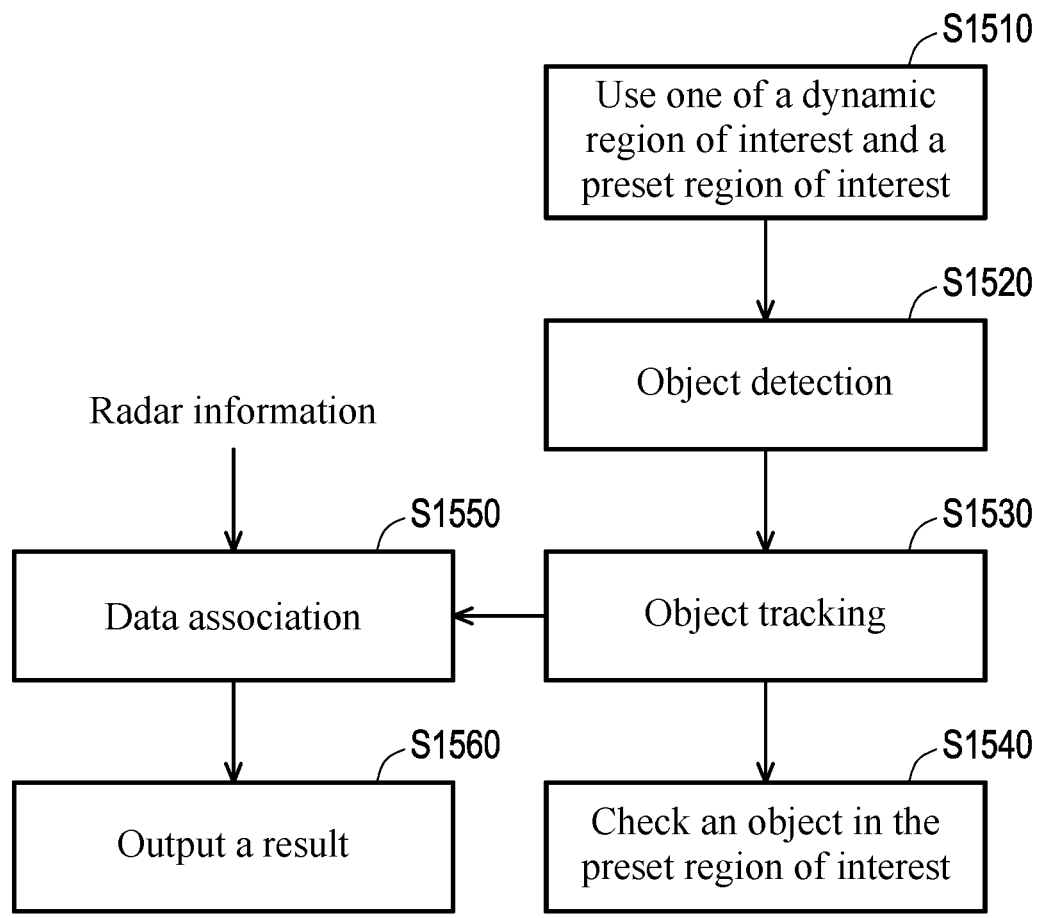
FIG. 15 is a flowchart of object detection and object tracking according to an embodiment of the invention.

Then, object detection and object tracking are described. FIG. 15 is a flowchart of object detection and object tracking according to an embodiment of the invention. Referring to FIG. 15, the processor 150 may use one of a dynamic region of interest and a preset region of interest (i.e., a fixed region) (step S1510). As described in step S230, according to the result of the second clustering, it is determined to select the region with the first density to form the (dynamic) region of interest or to select the fixed region as the region of interest according to the result of the second clustering, and details thereof are not repeated.

Regarding object detection (step S1520), the processor 150 may input the sensing image of the channels (for example, the multi-channel array MCA of FIG. 14) into a detection model for object detection to a prediction result of the detection model. There are many algorithms for object detection. For example, YOLO (you only look once), SSD (single shot detector), or R-CNN. This combined information is only image data. Therefore, the combined information may be directly input to the detection model (i.e., the prediction model trained based on the aforementioned object detection algorithm) to accordingly output the prediction result. For example, the type and location of the object. In some embodiments, COCO, VisDrone, or other datasets may be used to detect a total amount of training samples for the object detection model.

The region of interest may be used for object detection. As shown in FIGS. 4A and 4B, if the dynamic region of interest DRI is used, the object O1 may be detected in the dynamic region of interest DRI. In an embodiment, the processor 150 may apply the region of interest to multi-dimensional object detection, so as to improve detection accuracy of a smaller object. For example, the processor 150 may directly crop the sensing image according to the region of interest and adjust a size thereof as required. This cropped sensing image may be input to the detection model. In addition, uncropped sensing image may also be input to the detection model together.

Regarding (multi) object tracking (step S1530), a main function of the object tracking is to track a same object framed by front and rear image frames. There are also many algorithms for object tracking. For example, Kalman filter, optical flow, SORT (simple online and realtime tracking) or deep SORT, joint detection and embedding (JDE), etc.

The processor 150 may perform object tracking according to the prediction result of the object detection. For example, the prediction result of the object detection may be used as an input for the object tracking.

Figure 16:
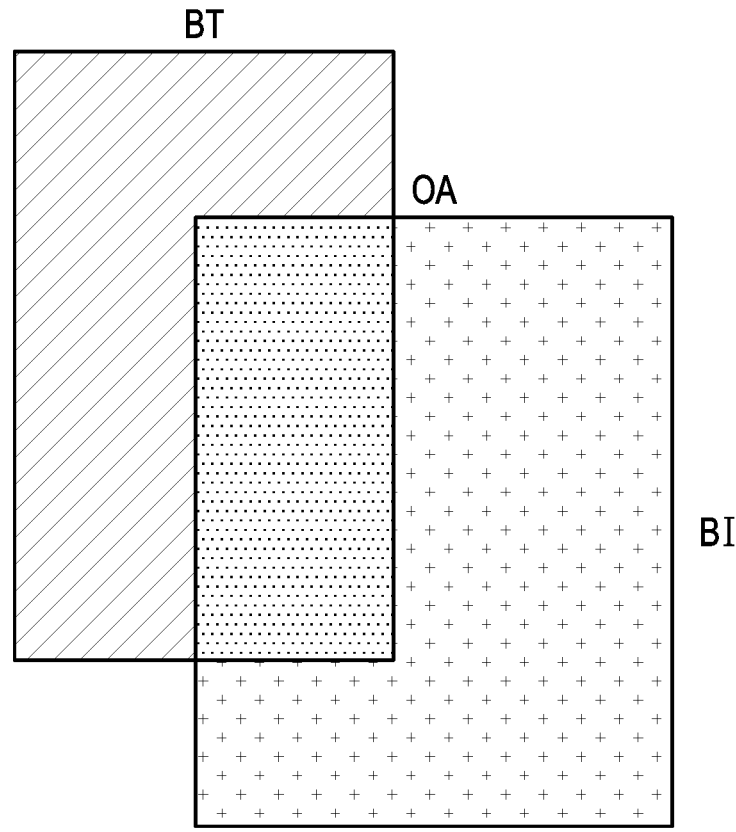
FIG. 16 is a schematic diagram of an intersection of unit (IoU) according to an embodiment of the invention.

In an embodiment, the prediction result may be preprocessed. The processor 150 may determine an overlapped region of a first framed region (one or a plurality of objects are framed) in the prediction result of the object detection and a second framed region (one or a plurality of objects are framed) of the object tracking. The overlapped region is an intersection of the first framed region and the second framed region. For example, FIG. 16 is a schematic diagram of an intersection of unit (IoU) according to an embodiment of the invention. Referring to FIG. 16, an intersection of a first framed region BT and a second framed region BI is an overlapped region OA (a region with a dotted background in the figure).

The processor 150 may determine whether the objects in the first framed region and the second framed region are the same according to a ratio of the overlapped region to a total region. This total region is a union of the first framed region and the second framed region. The intersection of unit is a ratio of the overlapped region to the total region. Namely, a result of dividing an area of the overlapped region by an area of the total region.

Taking FIG. 16 as an example, the intersection of unit includes a part of the second framed region BI framed by a tracker of the object tracking and a part of the first framed region BT framed by the object detection. If a value of the intersection of unit is greater than a threshold, the processor 150 may regard the objects in the first framed region BT and the second framed region BI as the same object. If the value of the intersection of unit is not greater than the threshold, the processor 150 may regard the objects in the first framed region BT and the second framed region BI as different objects.

In an embodiment, the processor 150 may detect whether there is an object in one or a plurality of fixed regions (step S1540). The fixed region is predefined. A second part of the one or plurality of fixed regions is not overlapped with the region of the first density or the region forming the group in the result of the second clustering. The processor 150 may update the region of interest according to a detection result of the fixed region. If an object is detected in the fixed region, the processor 150 may update the region of interest. For example, the region of interest is formed based on a position of the object in the image. If no object is detected in the fixed region, the processor 150 may disable/ignore/not update the region of interest.

The processor 150 may associate the prediction result and/or the tracking result with the radar information (step S1550). Due to heterogeneity of the radar information and the image, the sensing points detected by the radar 20 may be mapped to the framed region of the object detection and/or the object tracking through data association. In an embodiment, the processor 150 may use a combination optimization algorithm to pair one or more sensing points of the radar information with one or more target objects (framed) in the sensing image. The combination optimization algorithm is, for example, a Hungarian algorithm, a K-M algorithm (Kuhn-Munkres algorithm) or a dual method. Taking the Hungarian algorithm as an example, a Euclidean distance and an Mahalanobis distance may be applied to the data association. Since the radar information and the image use different dimensions, the Mahalanobis distance is more suitable for the association of heterogeneous data, but the invention is not limited thereto.

Finally, a result may be output (step S1560). For example, a prediction result, a tracking result and/or associated data.

In summary, in the dual sensing method and the computing apparatus for object sensing according to the embodiments of the invention, the radar information is performed with two times of clustering to determine the dynamic region of interest, and object detection and/or object tracking is performed on the combined information of the radar and the image capturing device according to the dynamic region of interest. Accordingly, identification accuracy of object detection and/or object tracking is improved through heterogeneous data combination. In addition, the embodiments of the invention may be further applied to intelligent transportation applications such as object movement trajectory analysis, traffic flow analysis, and visual blind spot approaching vehicle warning, etc.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A dual sensing method of an object, comprising:
performing a first clustering on radar information, wherein the radar information comprises a plurality of sensing points, and the first clustering is for determining a first part of the sensing points to be an object;
performing a second clustering on a result of the first clustering, wherein the second clustering is for determining that in response to the first part of the sensing points being the object in the result of the first clustering being located in a region of a first density;
taking a result of the second clustering as a region of interest;
using a fixed region as the region of interest, wherein the fixed region is predefined, and a result of the second clustering is a region that does not have the first density; and
performing at least one of object detection and object tracking on combined information according to the region of interest, wherein the combined information is formed by combining the radar information and an image, and a detection region of the radar information is overlapped with a photographing region of the image.

2. The method of claim 1, wherein a point number of the second clustering is less than a point number of the first clustering, and a range of the second clustering is smaller than a range of the first clustering; or, a point number of the second clustering is greater than a point number of the first clustering, and a range of the second clustering is larger than a range of the first clustering.

3. The method of claim 1, wherein taking the result of the second clustering as the region of interest comprises:
taking a center of the sensing points in the region of the first density as a center of the region of interest.

4. The method of claim 1, further comprising:
converting coordinates of the sensing points in the radar information into a plurality of image coordinates for generating converted radar information, wherein the converted radar information comprises the radar information on the image coordinates; and
combining the converted radar information and the image for generating the combined information.

5. The method of claim 4, wherein converting the coordinates of the sensing points in the radar information into the image coordinates comprises:
setting a coordinate relationship between a radar world coordinate and a camera world coordinate according to a relative position of a radar and an image capturing device, wherein the radar is for obtaining the radar information, and the image capturing device is for obtaining the image; and
determining the image coordinates according to the coordinate relationship, wherein the sensing points in the radar information are sequentially converted from a radar coordinate, the radar world coordinate, the camera world coordinate, and a camera coordinate into one of the image coordinates.

6. The method of claim 4, wherein a first sensing type in the radar information comprises at least one of a relative distance, a relative velocity, and an intensity, a second sensing type in the image comprises a plurality of color types defined by a color space, and combining the converted radar information and the image comprises:
  combining the converted radar information and the image into a sensing image of a plurality of channels according to the first sensing type and the second sensing type, wherein the channels respectively correspond to the color types and at least one of the relative distance, the relative velocity, and the intensity.

7. The method of claim 6, wherein performing at least one of the object detection and the object tracking on the combined information according to the region of interest comprises:
  inputting the sensing image of the channels into a detection model for the object detection to output a prediction result of the detection model; and
  performing the object tracking according to the prediction result.

8. The method of claim 1, wherein performing the at least one of the object detection and the object tracking on the combined information according to the region of interest comprises:
  determining an overlapped region of a first framed region in a prediction result of the object detection and a second framed region of the object tracking, wherein the overlapped region is an intersection of the first framed region and the second framed region; and
  determining whether the object in the first framed region and the second framed region is the same according to a ratio of the overlapped region to a total region, wherein the total region is a union of the first framed region and the second framed region.

9. The method of claim 1, wherein performing the at least one of the object detection and the object tracking on the combined information according to the region of interest comprises:
  detecting whether there is the object in the fixed region, wherein the fixed region is predefined, and a second part of the fixed region is not overlapped with the result of the second clustering; and
  updating the region of interest according to a detection result of the fixed region.

10. A computing apparatus for object sensing, comprising:
  a memory, for storing a program code; and
  a processor, coupled to the memory, and for loading and executing the program code to:
  perform a first clustering on radar information, wherein the radar information comprises a plurality of sensing points, and the first clustering is for determining a first part of the sensing points to be an object;
  perform a second clustering on a result of the first clustering, wherein the second clustering is for determining that in response to the first part of the sensing points being the object in the result of the first clustering being located in a region of a first density;
  take a result of the second clustering as a region of interest;
  using a fixed region as the region of interest, wherein the fixed region is predefined, and a result of the second clustering is a region that does not have the first density; and
  perform at least one of object detection and object tracking on combined information according to the region of interest, wherein the combined information is formed by combining the radar information and an image, and a detection region of the radar information is overlapped with a photographing region of the image.

11. The computing apparatus of claim 10, wherein a point number of the second clustering is less than a point number of the first clustering, and a range of the second clustering is smaller than a range of the first clustering; or, a point number of the second clustering is greater than a point number of the first clustering, and a range of the second clustering is larger than a range of the first clustering.

12. The computing apparatus of claim 10, wherein the processor further:
  takes a center of sensing points in the region of the first density as a center of the region of interest.

13. The computing apparatus of claim 10, wherein the processor further:
  converts coordinates of the sensing points in the radar information into a plurality of image coordinates for generating converted radar information, wherein the converted radar information comprises the radar information on the image coordinates; and
  combines the converted radar information and the image for generating the combined information.

14. The computing apparatus of claim 13, wherein the processor further:
  sets a coordinate relationship between a radar world coordinate and a camera world coordinate according to a relative position of a radar and an image capturing device, wherein the radar obtains the radar information, and the image capturing device obtains the image; and
  determines the image coordinates according to the coordinate relationship, wherein the sensing points in the radar information are sequentially converted from a radar coordinate, the radar world coordinate, the camera world coordinate, and a camera coordinate into one of the image coordinates.

15. The computing apparatus of claim 13, wherein a first sensing type in the radar information comprises at least one of a relative distance, a relative velocity, and an intensity, a second sensing type in the image comprises a plurality of color types defined by a color space, and the processor further:
  combines the converted radar information and the image into a sensing image of a plurality of channels according to the first sensing type and the second sensing type, wherein the channels respectively correspond to the color types and at least one of the relative distance, the relative velocity, and the intensity.

16. The computing apparatus of claim 15, wherein the processor further:
  inputs the sensing image of the channels into a detection model for the object detection to output a prediction result of the detection model; and
  performs the object tracking according to the prediction result.

17. The computing apparatus of claim 10, wherein the processor further:
  determines an overlapped region of a first framed region in a prediction result of the object detection and a second framed region of the object tracking, wherein the overlapped region is an intersection of the first framed region and the second framed region; and
  determines whether the object in the first framed region and the second framed region is the same according to a ratio of the overlapped region to a total region, wherein the total region is a union of the first framed region and the second framed region.

18. The computing apparatus of claim 10, wherein the processor further:
   detects whether there is the object in the fixed region, wherein the fixed region is predefined, and a second part of the fixed region is not overlapped with the result of the second clustering; and
   updates the region of interest according to a detection result of the fixed region.

* * * * *